(12) United States Patent
Paul et al.

(10) Patent No.: US 10,652,336 B2
(45) Date of Patent: *May 12, 2020

(54) COSMETIC DEVICE SYSTEM WITH A COMMUNICATION AND POWER INTERFACE FOR A COSMETIC DEVICE

(71) Applicant: L'OREAL, Paris (FR)

(72) Inventors: JoHannes D. Paul, Duvall, WA (US); Joseph E. Skidmore, Issaquah, WA (US)

(73) Assignee: L'OREAL, Paris (FR)

( * ) Notice: Subject to any disclaimer, the term of this patent is extended or adjusted under 35 U.S.C. 154(b) by 239 days.

This patent is subject to a terminal disclaimer.

(21) Appl. No.: 15/476,151

(22) Filed: Mar. 31, 2017

(65) Prior Publication Data

US 2018/0288160 A1 Oct. 4, 2018

(51) Int. Cl.
*H04L 29/08* (2006.01)
*A45D 44/00* (2006.01)
*A61H 7/00* (2006.01)
*A47K 7/04* (2006.01)
*A61H 23/02* (2006.01)
*H04B 1/3827* (2015.01)

(52) U.S. Cl.
CPC .......... *H04L 67/125* (2013.01); *A45D 44/005* (2013.01); *A47K 7/04* (2013.01); *A61H 7/005* (2013.01); *A61H 7/007* (2013.01); *A61H 23/0236* (2013.01); *H04L 67/22* (2013.01); *A45D 2044/007* (2013.01); *A61H 2201/0107* (2013.01); *A61H 2201/0153* (2013.01); *A61H 2201/0157* (2013.01); *A61H 2201/0184* (2013.01); *A61H 2201/1418* (2013.01); *A61H 2201/1671* (2013.01); *A61H 2201/1685* (2013.01); *A61H 2201/501* (2013.01); *A61H 2201/5012* (2013.01); *A61H 2201/5028* (2013.01); *A61H 2201/5046* (2013.01); *A61H 2201/5048* (2013.01); *A61H 2201/5064* (2013.01); *A61H 2201/5071* (2013.01); *H04B 1/3833* (2013.01)

(58) Field of Classification Search
CPC ...... A47K 7/04; H04B 1/3833; H04L 67/125; H04L 67/12; H04M 11/007
See application file for complete search history.

(56) References Cited

U.S. PATENT DOCUMENTS

| | | | |
|---|---|---|---|
| 2007/0103274 A1* | 5/2007 | Berthold | G06K 19/0723 340/10.51 |
| 2012/0151697 A1* | 6/2012 | Farrell | A46B 7/04 15/22.1 |
| 2016/0206087 A1* | 7/2016 | Skidmore | A46B 13/008 |

* cited by examiner

*Primary Examiner* — June Y Sison
(74) *Attorney, Agent, or Firm* — Oblon, McClelland, Maier & Neustadt, L.L.P.

(57) ABSTRACT

A personal cosmetic appliance system that includes a personal cosmetic appliance including a main unit physically configured to couple with a detachable unit having a cosmetic applicator configured to perform a cosmetic treatment on a body part of the user and a detachable unit communication interface, the main unit including a main unit communication interface having circuitry configured to communicatively couple to the detachable unit communication interface to transmit and receive information with the detachable unit, and to communicatively couple at least one of the detachable unit communication interface and the main unit communication interface to a client device associated with the personal cosmetic appliance.

18 Claims, 19 Drawing Sheets
(10 of 19 Drawing Sheet(s) Filed in Color)

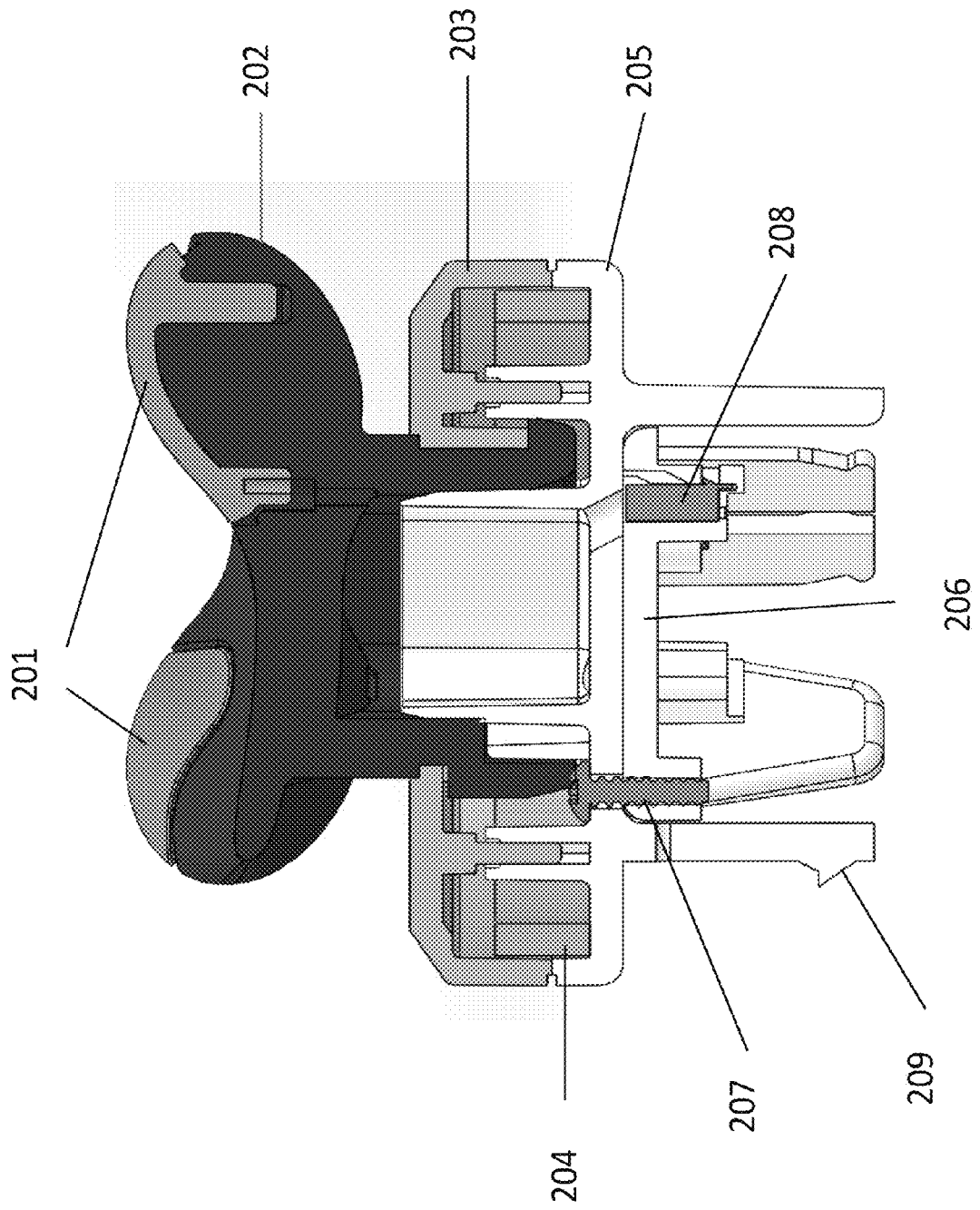

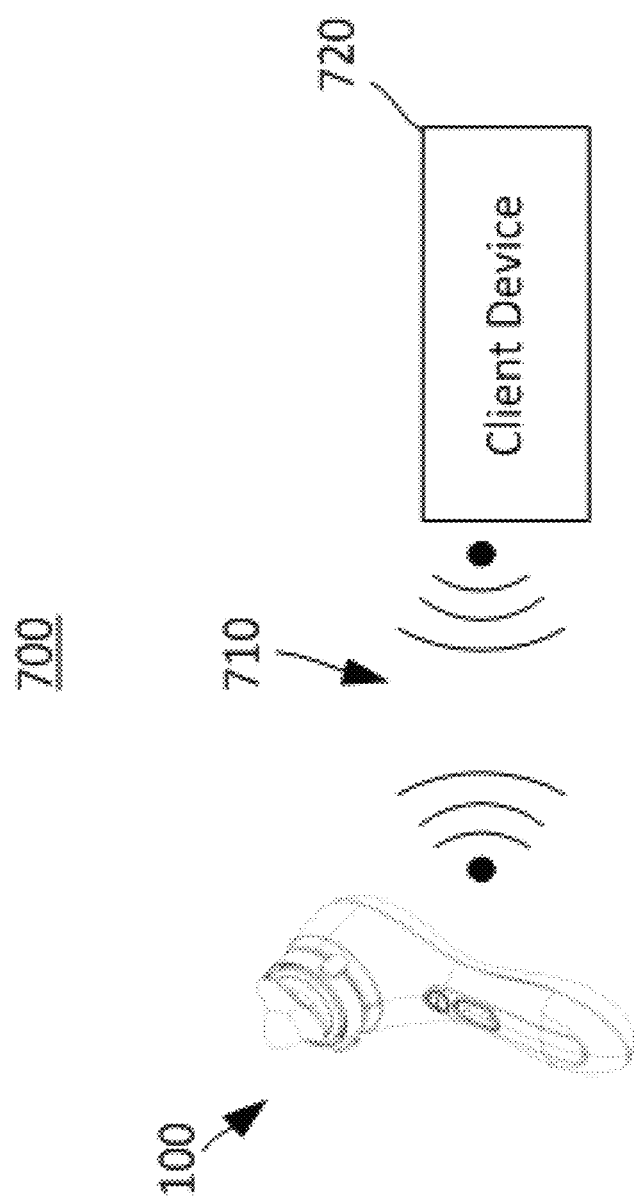

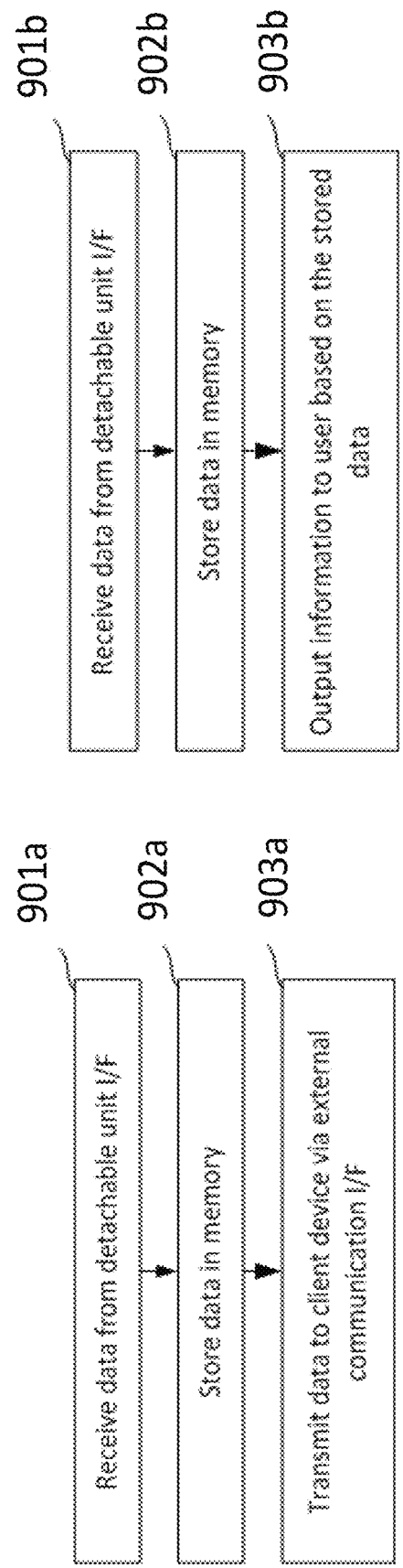

COSMETIC DEVICE SYSTEM WITH A COMMUNICATION AND POWER INTERFACE FOR A COSMETIC DEVICE

BACKGROUND

Field

The present disclosure describes a cosmetic device system with an interface that provides a connection for communication and power between a master and slave cosmetic device.

SUMMARY

In an embodiment, a personal cosmetic appliance system is provided comprising: a personal cosmetic appliance including a main unit physically configured to couple with a detachable unit having a cosmetic applicator configured to perform a cosmetic treatment on a body part of the user and a detachable unit communication interface, the main unit including a main unit communication interface having circuitry configured to communicatively couple to the detachable unit communication interface to transmit and receive information with the detachable unit, and to communicatively couple at least one of the detachable unit communication interface and the main unit communication interface to a client device associated with the personal cosmetic appliance.

In an embodiment, the main unit communication interface includes circuitry configured to establish a secured protocol and to exchange encrypted and anonymized information with the client device.

In an embodiment, the main unit communication interface includes circuitry configured to exchange sensor information with the detachable unit.

In an embodiment, the circuitry of the main unit is configured to transmit the sensor information to the client device for display on the client device.

In an embodiment, the main unit communication interface includes circuitry configured to exchange control information with a detachable unit associated with a cosmetic applicator.

In an embodiment, the main unit is configured to receive data from the client device and process the received data.

In an embodiment, the data received from the client device is command or control data for controlling an operation of the main unit of the personal cosmetic appliance.

In an embodiment, the main unit is configured to receive data from the client device and transmit the data to the detachable unit via the main unit communication interface for processing the data at the detachable unit.

In an embodiment, the data received from the client device is data for controlling an operation of the detachable unit of the personal cosmetic appliance.

In an embodiment, the detachable unit includes at least one sensor, and the data received from the client device is for controlling the sensor.

In an embodiment, the data received from the client device for controlling the sensor is triggered by sensor data that was previously transmitted from the detachable unit to the client device via the detachable unit communication interface.

In an embodiment, the detachable unit includes a memory and the data received from the client device is for retrieving data from the memory.

In an embodiment, the main unit is communicatively coupled to the client device via a wireless connection.

In an embodiment, a method implemented by a personal cosmetic appliance system is provided that includes a personal cosmetic appliance and a client device, where the personal cosmetic appliance includes a main unit physically configured to couple with a detachable unit having a cosmetic applicator configured to perform a cosmetic treatment on a body part of the user and a detachable unit communication interface, the method comprising: communicatively coupling, by circuitry of the main unit, to the detachable unit communication interface to transmit and receive information with the detachable unit, and communicatively coupling, by the circuitry of the main unit, at least one of the detachable unit communication interface and the main unit communication interface to a client device associated with the personal cosmetic appliance.

In an embodiment, the method further comprises establishing a secured protocol and to exchange encrypted and anonymized information with a client device.

In an embodiment, the method further comprises exchanging sensor information with the detachable unit.

In an embodiment, the circuitry of the main unit is configured to transmit the sensor information to the client device for display on the client device.

In an embodiment, the method further comprises exchange control information with the detachable unit.

In an embodiment, the method further comprises receiving data from the client device and processing the received data.

In an embodiment, the method further comprises receiving data from the client device and transmitting the data to the detachable unit via the main unit communication interface for processing the data at the detachable unit.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A more complete appreciation of the embodiments and many of the attendant advantages thereof will be readily obtained as the same becomes better understood by reference to the following detailed description when considered in connection with the accompanying drawings, wherein:

FIGS. 2A-2B show details of a detachable unit of the personal cosmetic appliance according to an embodiment.

FIG. 7A shows a system 700 that includes a personal cosmetic appliance 100, as discussed above, and a client device, according to an embodiment.

FIGS. 9A-9B show different methods performed by circuitry of the main unit according to an embodiment.

DETAILED DESCRIPTION

The present disclosure describes a system, device, and method in which a communication interface is provided between a main unit of a personal cosmetic device and a detachable unit that connects with the main unit for providing a particular functionality.

Figure 1A:
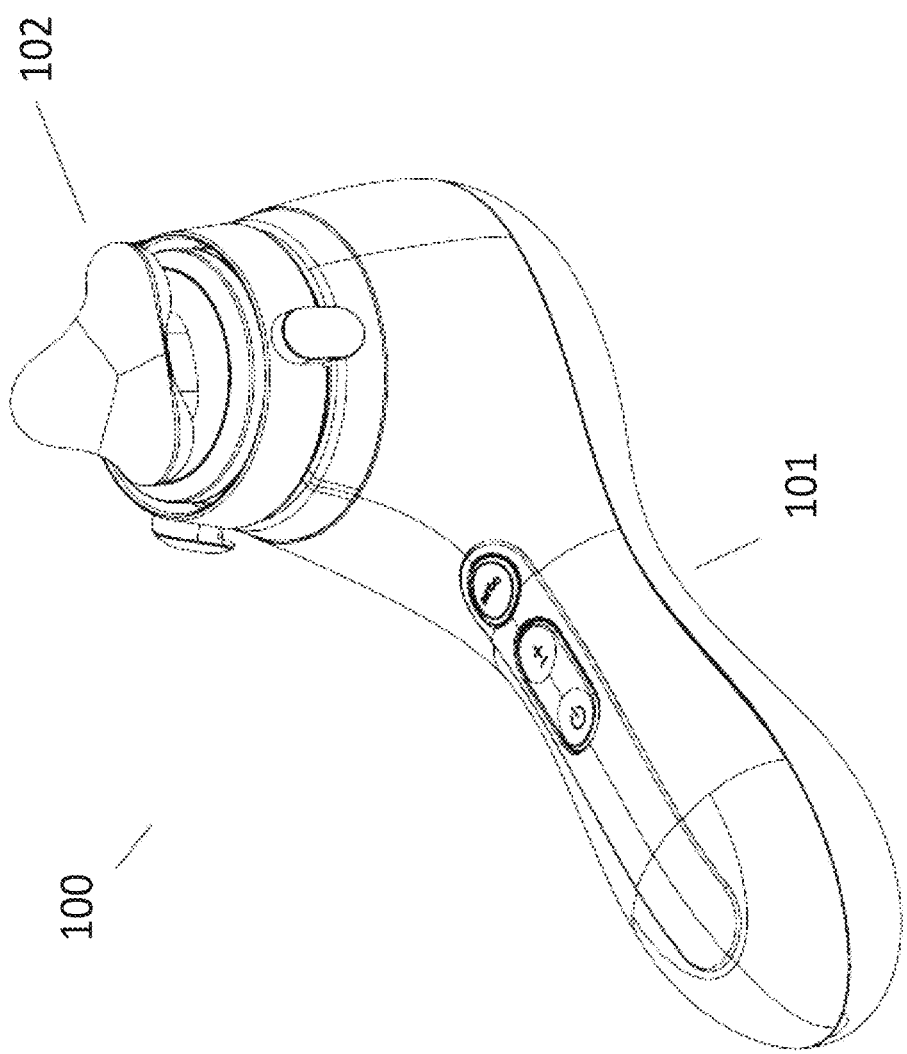
FIGS. 1A-1B show a personal cosmetic appliance and its components according to an embodiment.

FIG. 1A shows a personal cosmetic appliance 100 according to an embodiment. The device 100 includes a main unit 101 and a detachable unit 102. The personal cosmetic appliance 100 shown in FIG. 1 is used for massaging and/or cleansing a user's skin using a three-headed massaging applicator as shown on the detachable unit 102. The main unit provides power and control of the overall device including the detachable unit 102. While this particular type of personal cosmetic device is shown in FIG. 1A, the claims are not limited to this particular type of device and may be applicable to other types of personal cosmetic devices which include a main unit and a detachable unit.

Figure 1B:
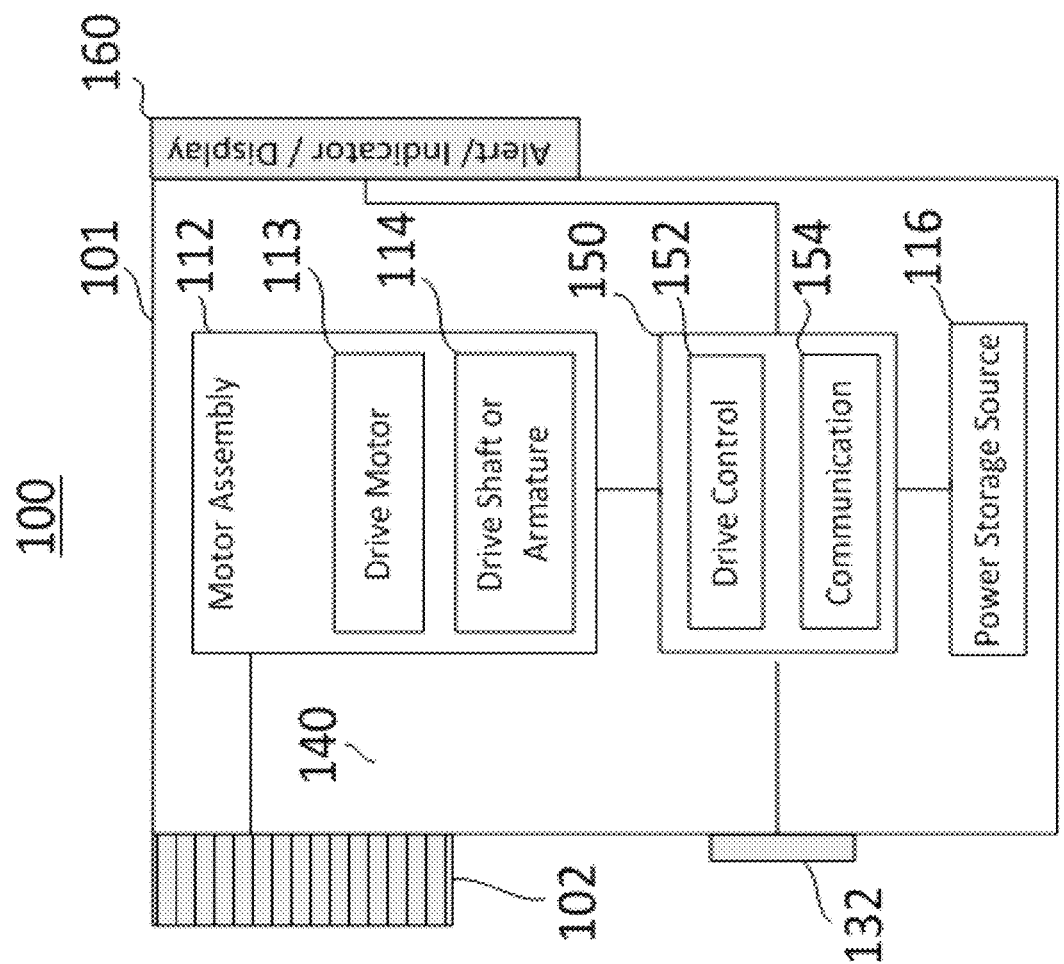

The main unit 101 houses an operating structure of the appliance 100. As shown in a block diagram form in FIG. 1B, the operating structure in one embodiment includes a motor assembly 112, a power storage source 116, such as a rechargeable battery, and a controller 150. The controller 150 includes a drive control 152 and a communication part 154. In an aspect, the controller 150 can be controlled by on/off button 132 configured and arranged to selectively connect power from the power storage source 116 to the motor assembly 112. The power storage source 116 can be charged by power delivered by a cable connected to the appliance (not shown). In an alternative embodiment the power storage source 116 can be charged by any wireless means including by pLink charging system, inductive Qi charging system and AirFuel. A wireless charging status can be shown as an indicator on the appliance or on the central device. FIG. 1B represents a high-level view of the components of the personal cosmetic appliance 100, and more detailed hardware diagrams of both the main unit and the detachable unit will be described below.

FIG. 1B shows that the appliance 100 further including an alert part, an indicator, or a display 160 according to an example. The alert part can be configured to give an alert to the user based on any information related to operation of the device including data received from the detachable unit as will be discussed in detail below. The alert can be a sound, a visual alert, or a vibration or haptic feedback. In an aspect, the indicator and/or the display can be configured to communicate to the user, such as a routine on where and how to use the appliance 100 according to an example. In an aspect, the display can be a touch display and configured to receive input from the user. The functions of the display 160 may also be performed by an external client device having a display (such as a smartphone device). Such a client device is described in more detail below.

The motor assembly 112 in some embodiments includes an electric drive motor 113 that drives the detachable unit, via a drive shaft or armature 114. When the detachable unit is mounted to the main unit, the motor assembly 112 is configured to impart motion to the detachable unit. The motor assembly 112 may be configured to oscillate the detachable unit at sonic frequencies, typically in the range of 80-300 Hz, oscillating the brush head 120 back and forth within a range or amplitude of 3-20 degrees.

Figure 2B:
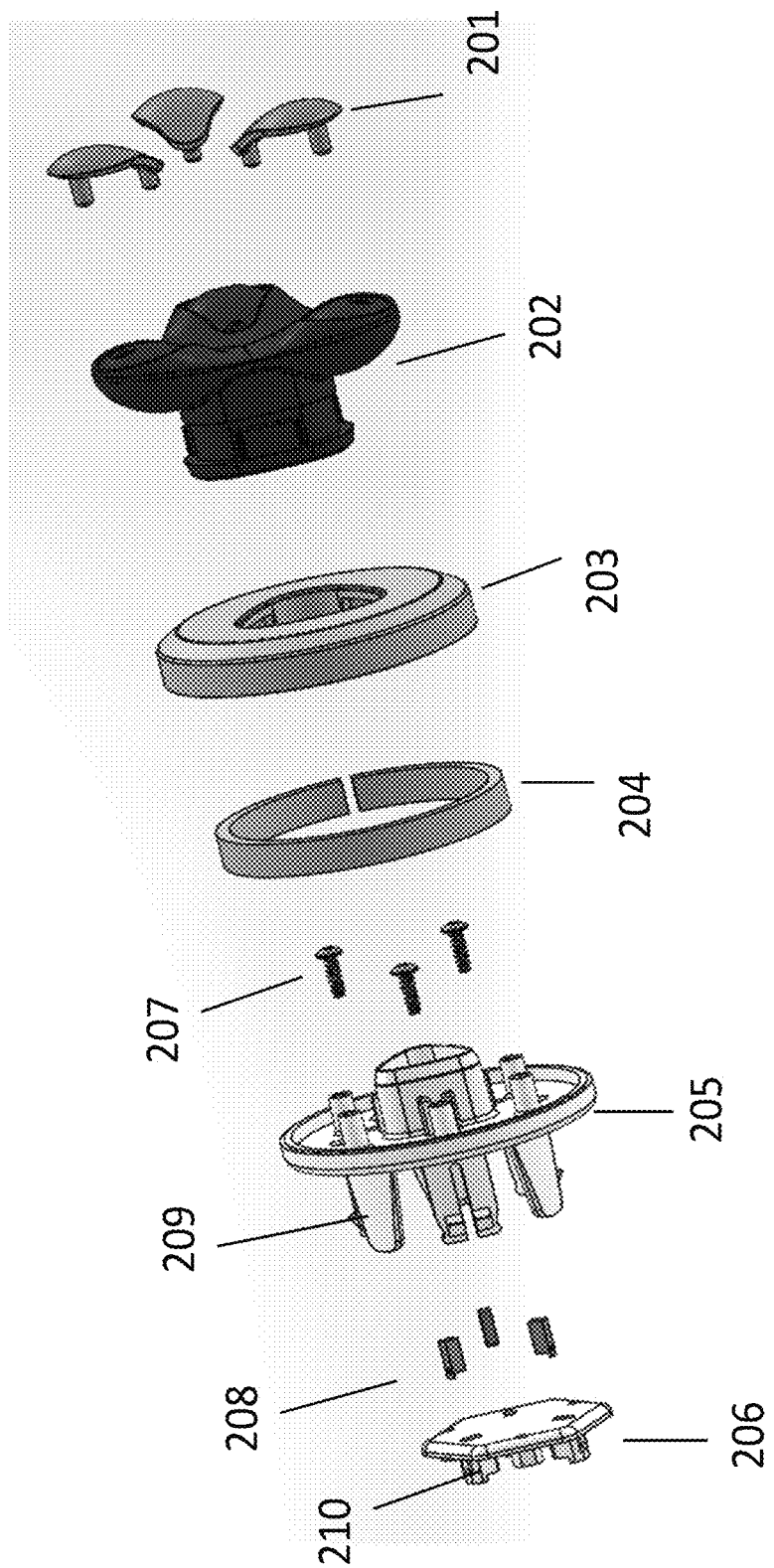

FIG. 2A-2B show details of the detachable unit 102. FIG. 2A shows a cross section of the detachable unit 102. FIG. 2B shows an exploded view of the detachable unit 102. The detachable unit 102 includes the skin contacts 201 which are inserted upon cosmetic head portion 202. The cosmetic head portion is held in place by the 'sandwiching' of an applicator top housing 203 and bottom housing 205. Inertial mass 204 is added to the detachable unit to allow the motor assembly to drive the applicator assembly at a specific oscillation frequency. Additionally, stage 206 supports electronic jack or pin connector 208 and is attached to the interface portion 205 via screws 207. The stage 206 further includes the socket features 210 through which the pin receivers are disposed. Also, the interface portion 205 includes legs 209.

Figure 3:
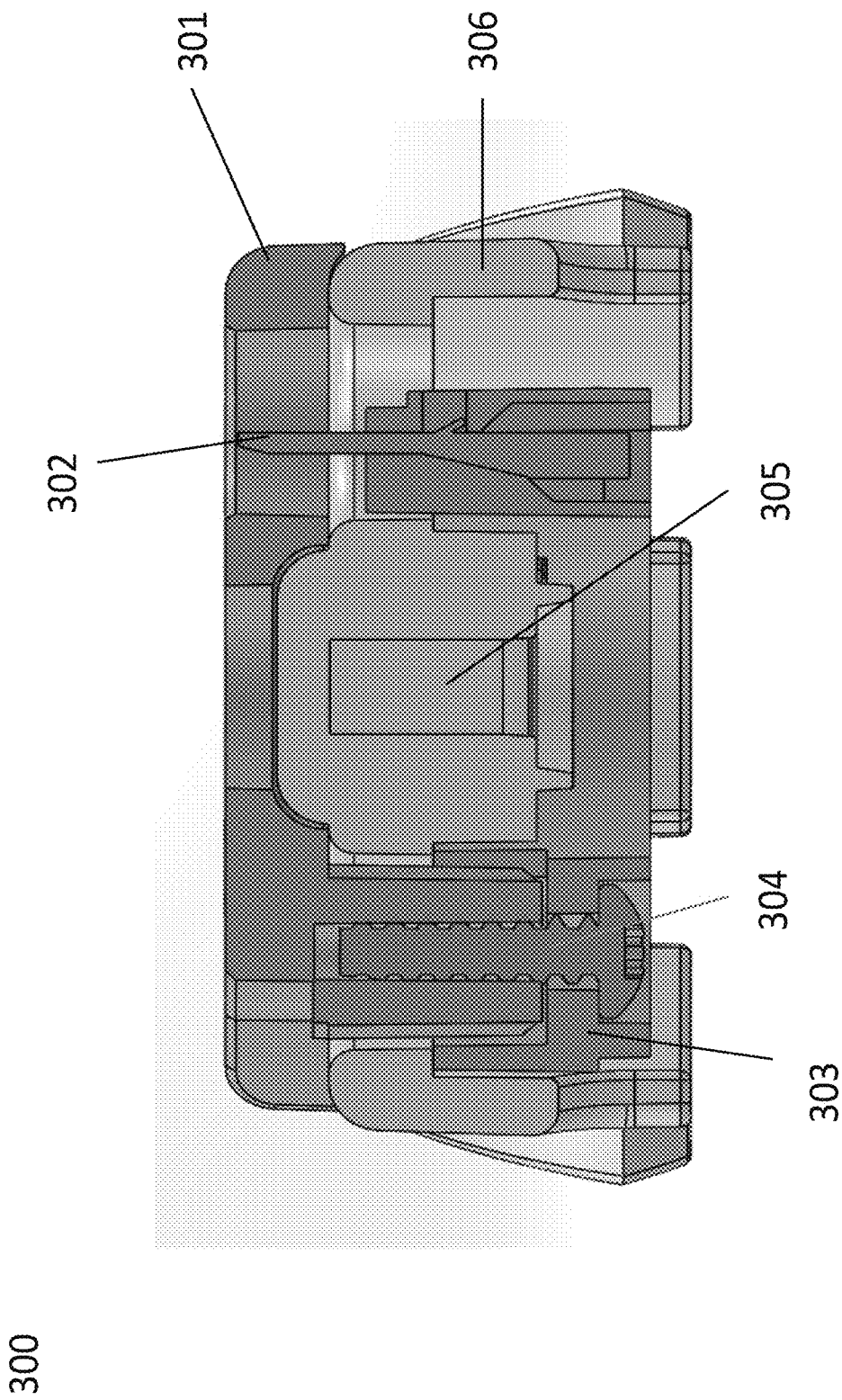
FIG. 3 shows details of a receiving unit in the main unit that receives the detachable unit according to an embodiment.

FIG. 3 shows details of a receiving unit 300 in the main unit that receives the detachable unit 102. The receiving unit 300 includes a top support 301 which includes at least one opening through which a connection pin 302 is disposed. The top support is connected to a bottom support 303 with a screw 304. The top support and bottom support are mounted on a motor hub 306 which is attached to the main unit.

Figure 4:
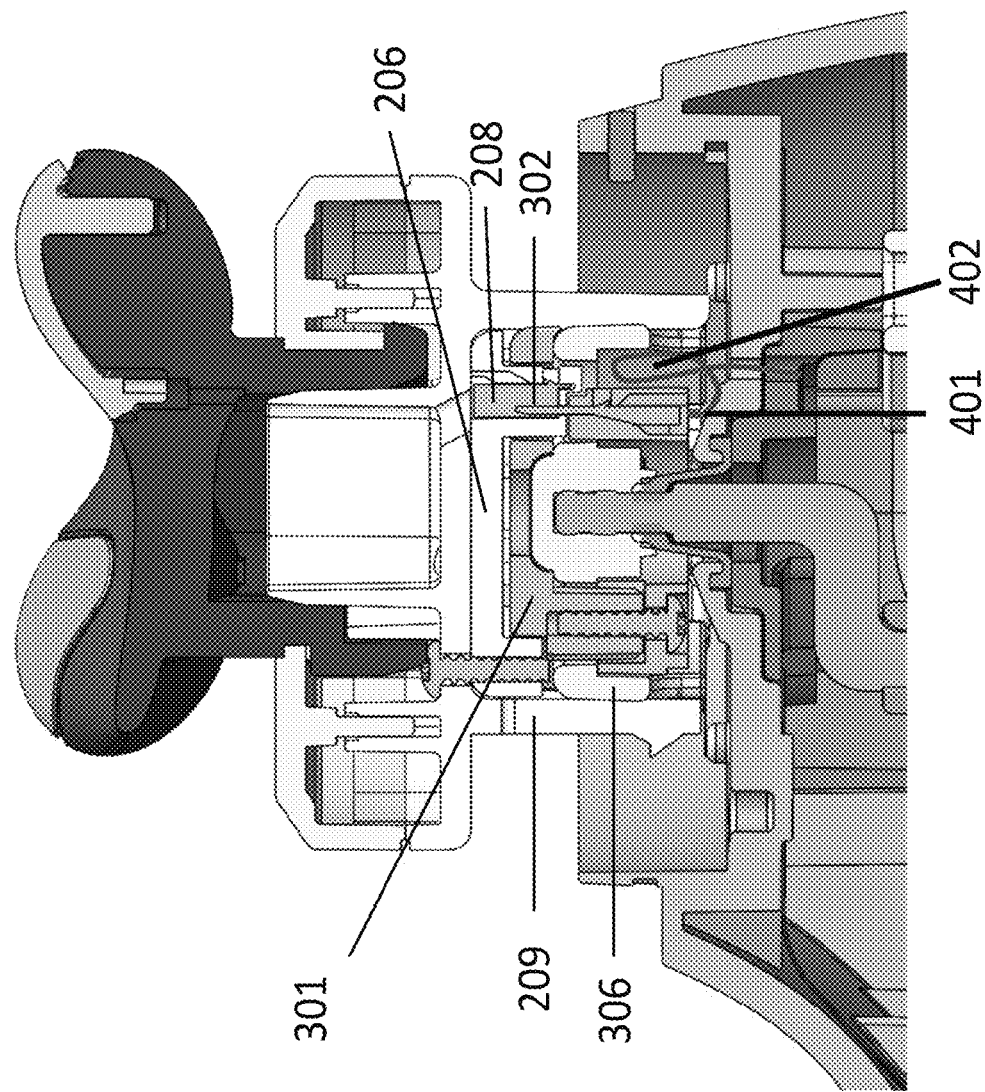
FIG. 4 shows a cross section of the detachable unit in a state of attachment with the receiving unit according to an embodiment.

FIG. 4 shows a cross section of the detachable unit in a state of attachment with the receiving unit 300. It can be seen that the legs 209 of the interface portion 205 of the detachable unit 102 cradle the housing 306 of the receiving unit 300. The top support 301 of the receiving unit receives the sockets 210 of the stage 206. Thus, the rotation or oscillation of the motor in the motor unit 305 is translated to the detachable unit via the coupling of the sockets 210 and the stage 206. Further, the pin 302 engages with a pin connector/plug 208 that is embedded in the socket 210. A wire 401 may be attached to the pin 302 to connect the pin with processing circuitry and a power supply of the main unit 101. The wire is connected through a space 402 that exists between the pin and the housing 306 of the receiving unit. This space 402 is configured so as to provide slack to the wire 401 while the pin oscillates as necessary along with the components of the detachable unit (at an angular range of approximately 3-20°). This is shown as a single pin interface, as is understood in the art. However, the claimed invention is not limited to this specific type of interface and it could be a multi-pin interface as well.

The connection between the pin 302 and the pin connector 208 forms an electrical connection which allows communication of data between the main unit 101 and the detachable unit 102. A type of communication protocol used to send and receive data over the interface between the pin 302 and the pin connector 208 is understood in the art and could be, for example, I²C ('Inter-Integrated Circuit' protocol), SPI ('Serial Peripheral Interface' protocol) or single-wire interface.

Figure 5:
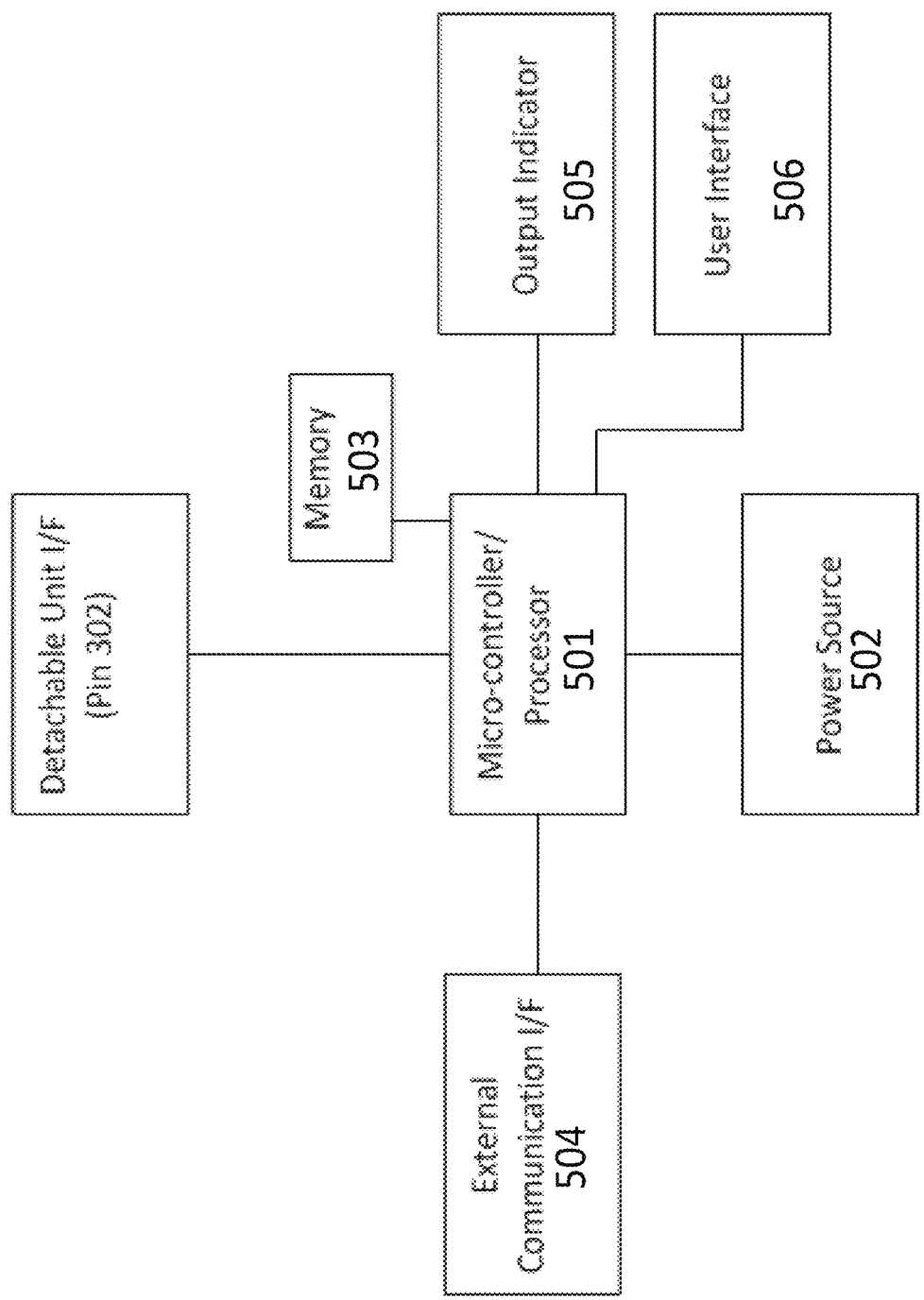
FIG. 5 shows hardware components of the main unit according to an embodiment.

FIGS. 5 and 6 show block diagrams of the hardware used in the main unit and the detachable unit, respectively.

FIG. 5 shows that the hardware of the main unit may include a micro-controller/processor 501, a power source 502, and a memory 503. The processor 501 of the main unit is coupled to the pin 302 described above, which acts as an interface with the detachable unit. The main unit may further include an external communication interface 504 for communicating with devices or networks external to the cosmetic appliance. The main unit may include an output indicator 505 for outputting signals or data for the user. The output indicator may be a light indicator, such as one or more LED indicator lights, it could be an audible indicator, and/or it could be a display screen with information. A user interface 506 is an area on the cosmetic appliance for the user to provide inputs. The user interface 506 may be in the form of input buttons or it could a touch-sensitive display screen.

In an example, the communication interface (I/F) 504 can include circuitry and hardware for communication with a client device (described in more detail below). The communication interface 504 may include a network controller such as BCM43342 Wi-Fi, Frequency Modulation, and Bluetooth combo chip from Broadcom, for interfacing with a network. The hardware for the micro-controller/processor 501 can be designed for reduced size. For example, the processor 501 may be a CPU as understood in the art. For example, the processor may be an APL0778 from Apple Inc., or may be other processor types that would be recognized by one of ordinary skill in the art. Alternatively, the CPU may be implemented as an FPGA, ASIC, PLD, embedded processor or using discrete logic circuits, as one of ordinary skill in the art would recognize. Further, the CPU may be implemented as multiple processors cooperatively working in parallel to perform the instructions of the inventive processes described above. The client device may also have similar circuitry and hardware as described above.

Figure 6A:
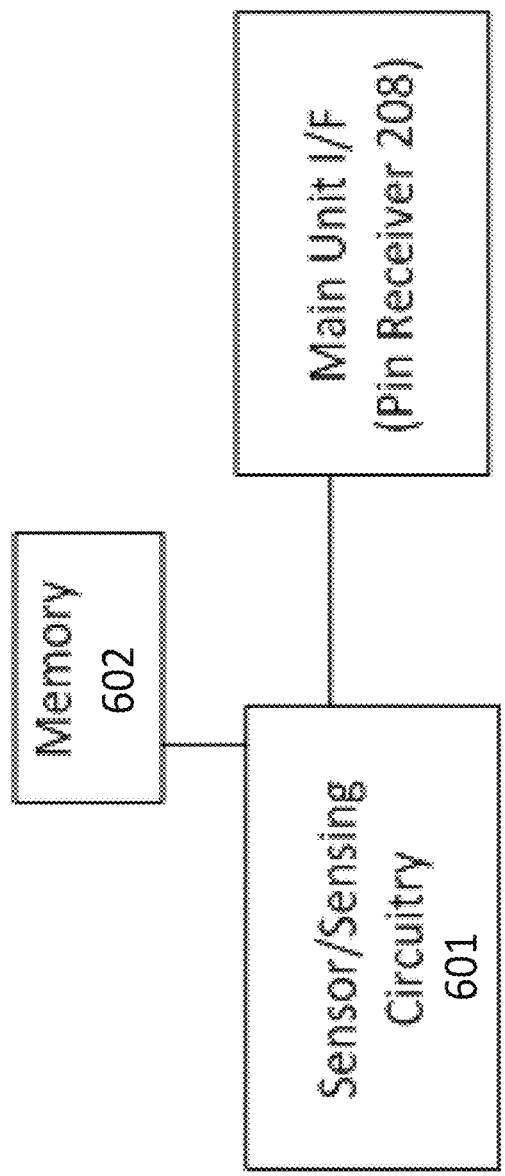
FIGS. 6A-6B show hardware components of the detachable unit according to an embodiment.

FIG. 6A shows that the hardware of the detachable unit includes a sensor or sensing circuitry 601 and a memory 602. The sensing circuitry 601 is coupled to the pin connector 208, described above, which acts as an interface with the main unit. The sensing circuitry 601 may include an additional microprocessor (not shown) that pre-processes data by storing, sorting, evaluating, or analyzing the data, and then sends the data via the connector to the main unit, at which point the data may be further manipulated and then possibly sent to an application, cloud system, or other destination.

Figure 6B:
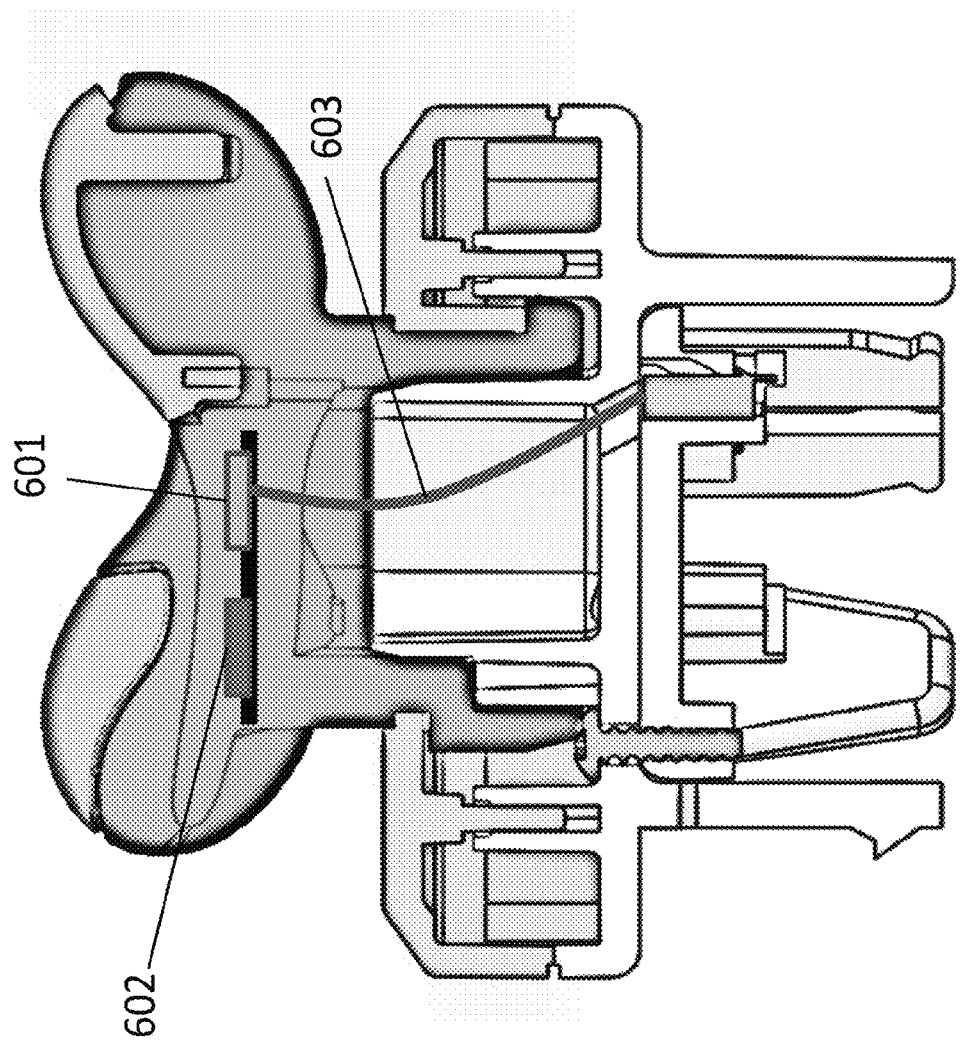

FIG. 6B illustrates how the hardware of the detachable unit may be disposed with reference to the drawing of FIG. 2A. Specifically, the sensing circuitry 601 and the memory 602 may be disposed in the cosmetic head portion 202 as integrated circuit components on a printed circuit board (PCB), and the sensing circuitry may have a wired connection, via wire 603, with the pin connector 208.

Notably, the pin 302 and the pin connector 208 are both embedded on moving parts of the receiving unit and the detachable unit which oscillate together. This is advantageous because it allows the connection from the sensor all the way to the pin to be in the oscillating portions of the combined structure. This way any slack necessary to allow a connection between a fixed portion of the structure and the oscillating portion of the structure can be completely contained within the main unit of the appliance, which provides more flexibility in designing the detachable unit.

The memory used in the above hardware examples may be a type of memory understood in the art. Non-limiting examples of memory include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of memory include Erasable Programmable Read-Only Memory (EPROM), flash memory, or the like.

The type of sensor or sensing circuitry 601 used in the detachable unit will vary depending on the type of cosmetic appliance, and more specifically, the type of detachable unit being used.

The example described above, for personal cosmetic device 100 shown in FIG. 1, is used for massaging and/or cleansing a user's skin using a three-headed massaging applicator. Therefore, a type of sensor and sensing circuitry may be of a type for performing skin analysis of the user's skin.

For example, one type of sensor is used for detecting a moisture level of the user's skin. Such a sensor may operate by passing current through user skin which allows the sensor to measure resistance/impedance of user skin and evaluate electrolyte concentrations in user skin.

Another type of sensor is used for detecting the pigmentation of a user's skin. Such a sensor may operate by using cross polarized light, UV image capture etc.

Additional types of sensors may evaluate skin photodamage, pore size, sebum concentrations, and potential environmental factors such as air pollution, UV levels.

FIG. 7A shows a system 700 that includes a personal cosmetic appliance 100, as discussed above, and a client device 720. In an embodiment, the personal cosmetic appliance 100 is in communication with the client device 720 with a wireless signal 710. In an embodiment, the client device 720 is configured to operate a software application or set of software modules to receive and send communications from and to the personal cosmetic appliance 100. In an example, the software application can send a protocol or target profile to the personal cosmetic appliance 100, as well as receive data from the personal cosmetic appliance 100 to track the usage in real time.

Figure 7B:
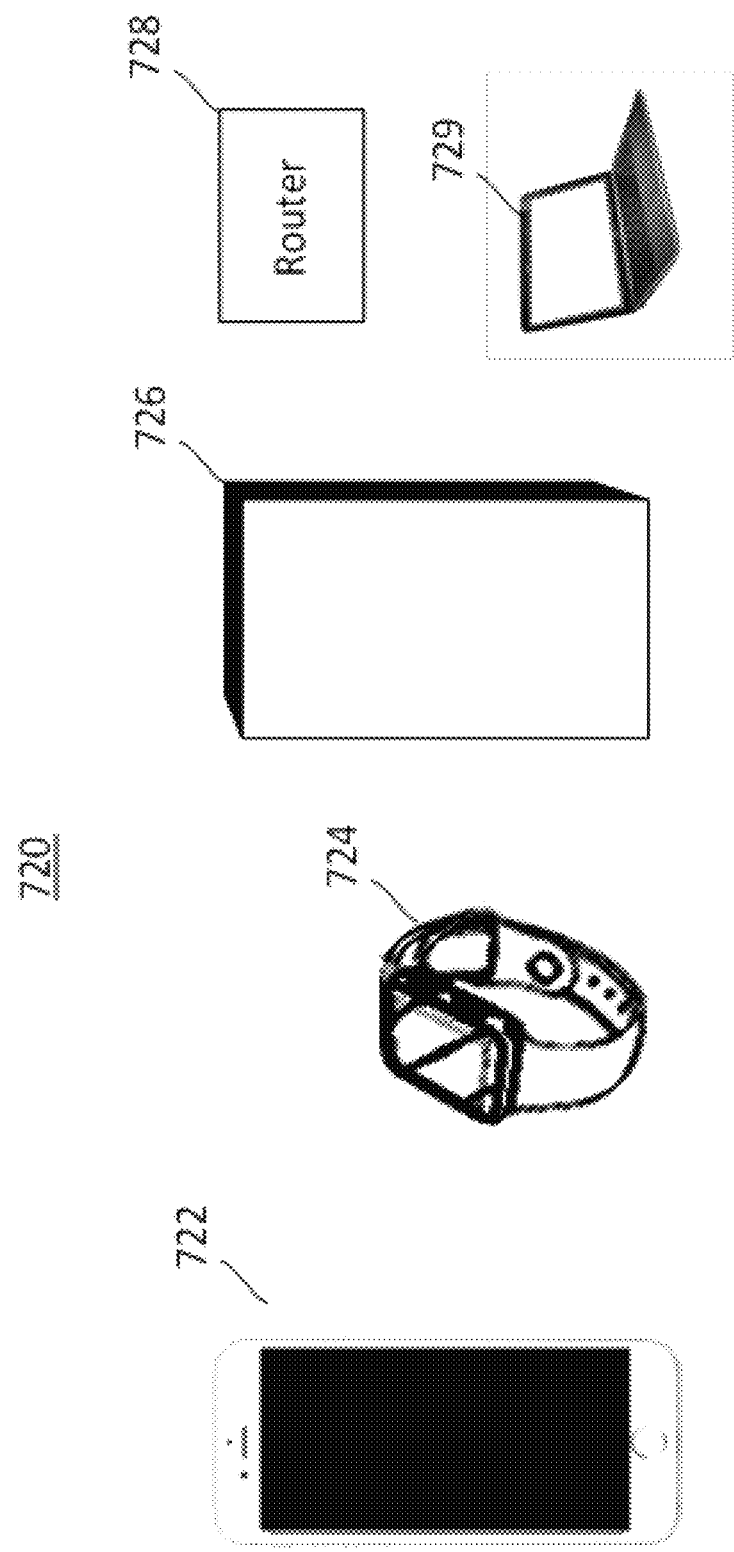
FIG. 7B shows different examples of the client devices according to embodiments.

FIG. 7B shows different examples of the client devices 720 including, a mobile device 722, a wearable electronic device 724, a television or magic mirror 726, a network router 728, and a personal computer 729.

The wireless signal 110 can be any appropriate signal such as an electromagnetic signal including WiFi, Bluetooth, near-field, or any other signal such as optical, and acoustic. Each client device, including the appliance, may communicate with each other through an internet connection via an 802.11 wireless connection to a wireless internet access point, or a physical connection to the internet access point, such as through an Ethernet interface. Each connected device is capable of performing wireless communication with other devices, such as through a Bluetooth connection or other wireless means as well.

Figure 7C:
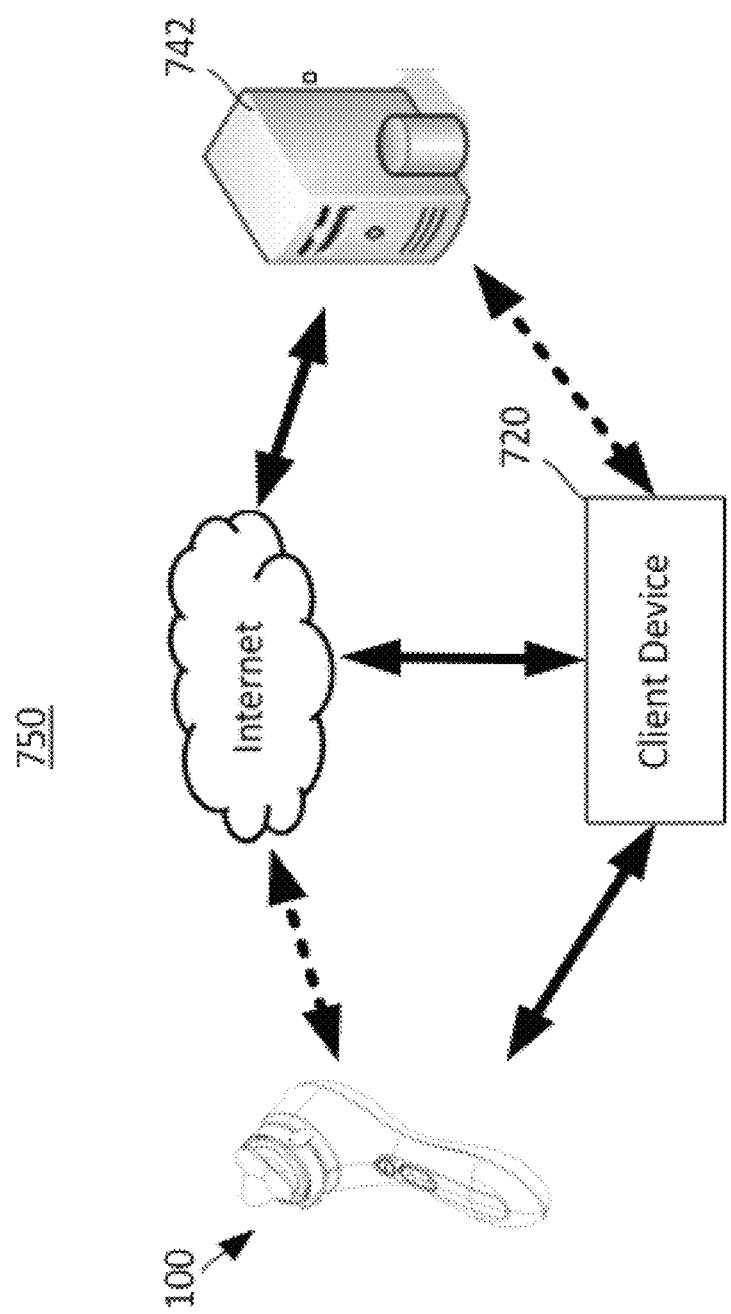
FIG. 7C shows an example of a system to promote optimum performance of a personal cosmetic appliance, according to an embodiment.

FIG. 7C is a diagram representing an example of a system 750 to promote optimum performance of a personal cosmetic appliance 100, according to one example. The system 750 includes at least the personal cosmetic appliance 100 and the client device 720. Optionally, the system 750 may further include one or more external servers 742 which are implemented as part of a cloud-computing environment and in communication with the system 750 through the Internet. The one or more external servers 742 can store user data, products such as formulations, protocols and routines, tutorials, as well as other 3rd party services according to an example.

The client device 720 is configured, in one example, to collect information about a user's use of the personal cosmetic appliance and to provide output to the user. The operating system of the client device can have a user interface that is configured to perform multiple functions. In an aspect, the client device can be in communication with a network and enable the user interface access to the Internet as well as Internet of Things (IOT). As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. In an example, the network can access a server hosting media, protocols, products, personal accounts, stored usage data, and other data related to the appliance, the brushheads, and skin care.

The user interface can display tutorials on how to use the personal cosmetic appliance The client device can create and download protocols for a regimen or routine that can be displayed on the user interface. The user interface can coach, track usage and compare the tracked usage to the protocol, the regimen, and the routine. The user interface can calculate a score based on the tracked usage. The user interface can store the scores and the tracked usage of the personal cosmetic appliance in memory of the client device. The user interface can be used to make a purchase of any products related to the personal cosmetic appliance. For instance, the personal cosmetic appliance may be used with a combination of styling products or chemical compositions used for treating the user's skin or hair, and the client device can output recommendations on particular products to be used, and which step in the process they are to be used, based on the desired results inputted by the user.

As an initial step, the client device may optionally collects information regarding a user's characteristics (such as skin tone, moisture level, or pigmentation analyzed by a sensor on the detachable unit) and usage patterns. The client device may store search results locally or may connect to an external system or server to access the database or search results.

The user may also access tutorials for using the personal cosmetic appliance to achieve a target look. The tutorials may be in text form, still image form, video form, or audio-only form.

In addition to using the tutorials, the user may connect the client device 720 with the personal cosmetic appliance over the wireless connection (such as the Bluetooth or Wi-Fi connection) to receive real-time feedback while using the personal cosmetic appliance, or to record the usage of the personal cosmetic appliance for later reporting or feedback.

For example, while using the personal cosmetic appliance, a motion sensor on the personal cosmetic appliance can output a detection motion of the personal cosmetic appliance as feedback to the client device. The client device is configured to compare the detected motion with predetermined motion data for providing real-time performance results to the user to or to output instructions for the user to make a correction.

The client device can also have a camera function that can be used to provide inputs to the customer profile. For instance, the camera can take images of the user's skin to determine the state of the user's skin based on visual data, or to make further recommendations to the user based on the characteristics of the skin.

The client device is configured to upload data regarding the user to an external system or server (such as a cloud-based system). Such data may include the user profile, amount of use of the personal cosmetic appliance, or performance results when using the personal cosmetic appliance. The client device can also provide an option to keep the user data anonymous.

The client device can use the camera function to provide a sharing feature, in which the user can upload photos taken before and/or after the use of the personal cosmetic appliance. The uploaded photos can be used for receiving feedback from professionals in the skin (or hair) treatment industry or other users. In an embodiment, the uploaded photos may be uploaded directly to a social media platform.

Furthermore, the circuitry of the main unit or the detachable unit of the personal cosmetic appliance 100 may be configured to actuate a discovery protocol that allows the main unit or the detachable unit and a remote enterprise to identify each other and to negotiate one or more pre-shared keys, which further allows the main unit or the detachable unit and a remote network to exchanged encrypted and anonymized information. The discovery protocol may further allow the main unit or the detachable unit and a remote network to exchange treatment regimen information depending on the type of applicator included in the detachable unit.

Figure 7D:
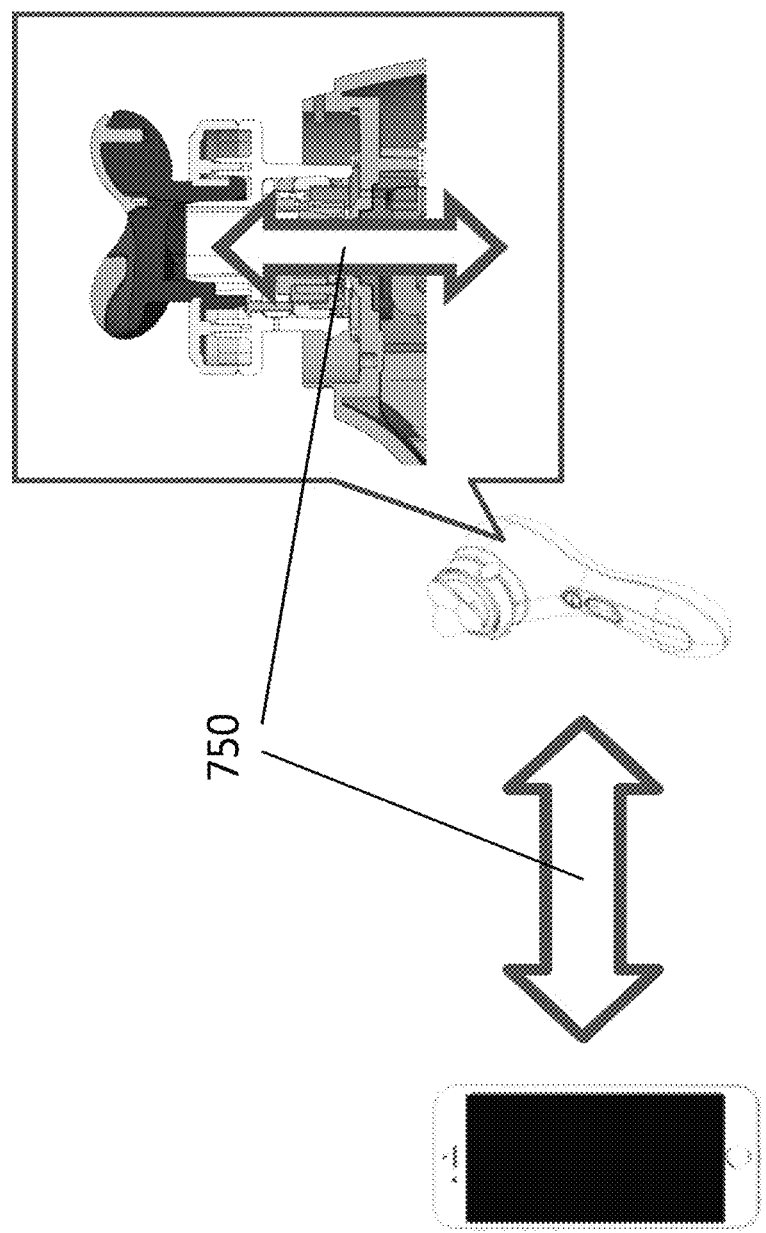
FIG. 7D shows a connection patch between the client device and the detachable unit according to an embodiment.

Furthermore, the circuitry of the detachable unit communication interface may be configured to exchange control commands with a remote network, such that a remote device may externally control the applicator and operation of the detachable unit. The circuitry of the detachable unit may be further configured to exchange diagnostic information with the above-described client device or another remote device. Such a connection is depicted in FIG. 7D, by which the communication path 750 to and from the client device is passed directly through the main unit of the personal cosmetic appliance to the detachable unit via the communication interfaces of the main unit and the detachable unit. Such a connection allows the main unit to avoid processing the received data unnecessarily if the data is marked to be passed through to the detachable unit. It also allows data or protocols between the client device and the detachable unit to be transparent to the main unit, which may allow for new or proprietary versions of the detachable unit to be used even if the main unit does not recognize or have the software to handle the specific type of data or protocols embedded in the payload of the data.

Figure 8:
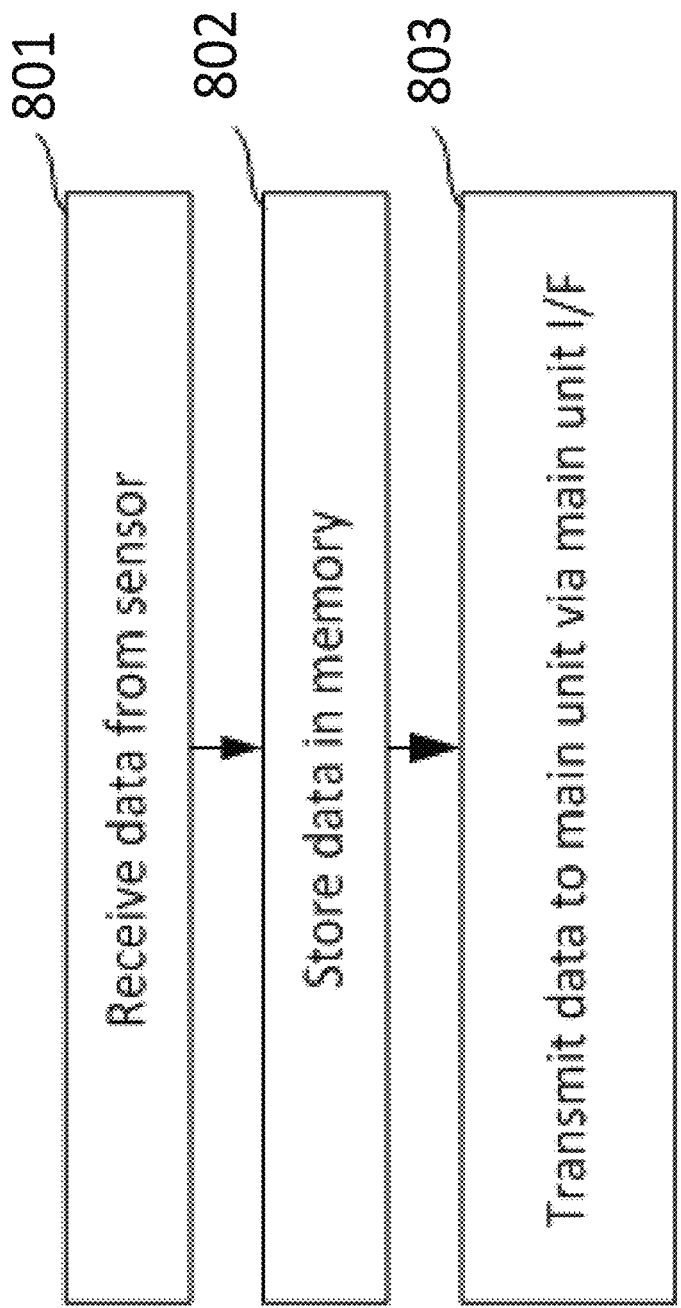
FIG. 8 shows a method performed by the circuitry of the detachable unit according to an embodiment.

FIGS. 8-10 shows examples of various processes and algorithms that may be performed by the different components in the system.

FIG. 8 shows a method performed by the circuitry of the detachable unit. In step 801, the sensor circuitry receives data from the sensor. The data received from the sensor may be data according to any one of the different types of sensor described above. The data received from the sensor may be stored in the memory of the detachable unit at step 802. In step 803, the data is retrieved from the memory and transmitted to the main unit via the main unit interface (pin connector 208). Step 802 is optional and the sensor circuitry may transmit the data directly to the main unit via the main unit interface as it is received from the sensor.

FIGS. 9A and 9B show different methods performed by the circuitry of the main unit. FIG. 9A represents a method performed when the data received from the detachable unit will be transmitted to an external client device, while FIG. 9B represents a method performed when the main unit will output information directly to the user at the personal cosmetic appliance. In both steps 901a and 901b, the circuitry of the main unit (such as processor 501) receives data from the detachable unit interface via pin 301. In both steps 902a and 902b, the circuitry stores the data at memory 503. In step 903a, the circuitry transmits the data to a client device via a communication interface (such as external communication I/F 504). On the other hand, in step 903b, the circuitry controls output of information directly to the user based on the stored data via output indicator 505 and/or user interface 506.

Figure 10A:
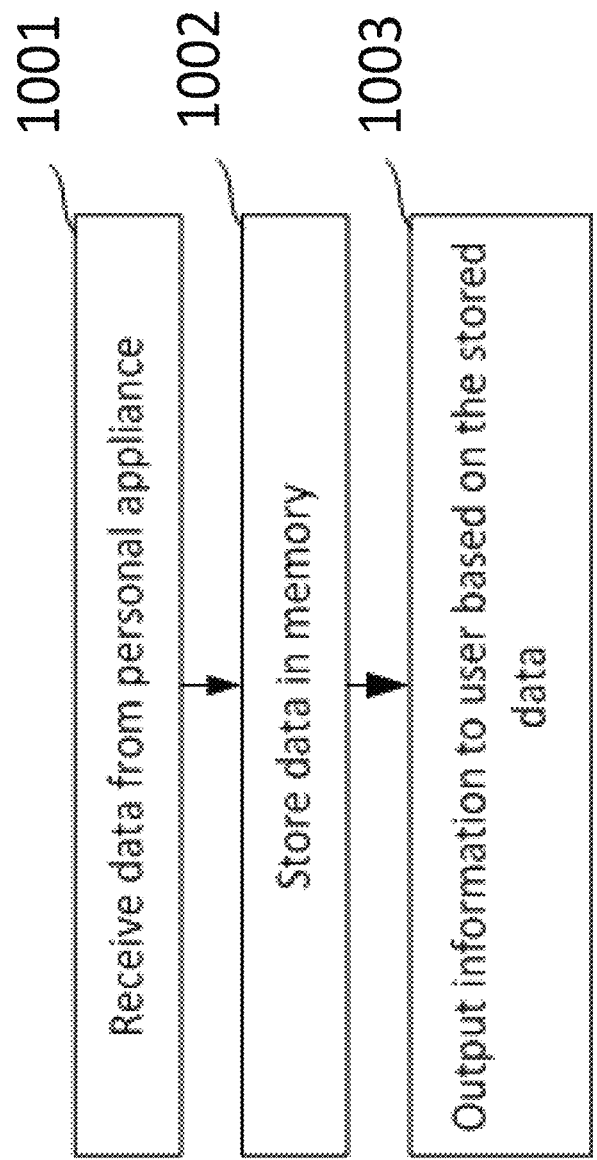
FIGS. 10A-10C show methods performed between the client device and the main unit according to embodiments.

FIG. 10A shows a method performed by circuitry of the client device, for example, when the main unit transmits data to the client device according to the method of FIG. 9A. At step 1001, the circuitry of the client device receives data from the personal cosmetic appliance, which could be over a wired or wireless communication interface of the client device that has a communication connection with the personal cosmetic appliance as was described above. At step 1002, the circuitry of the client device may store the data in the memory of the client device. At step 1003, the circuitry of the client device outputs information to the user based on the stored data via a display of the client device.

Figure 10C:
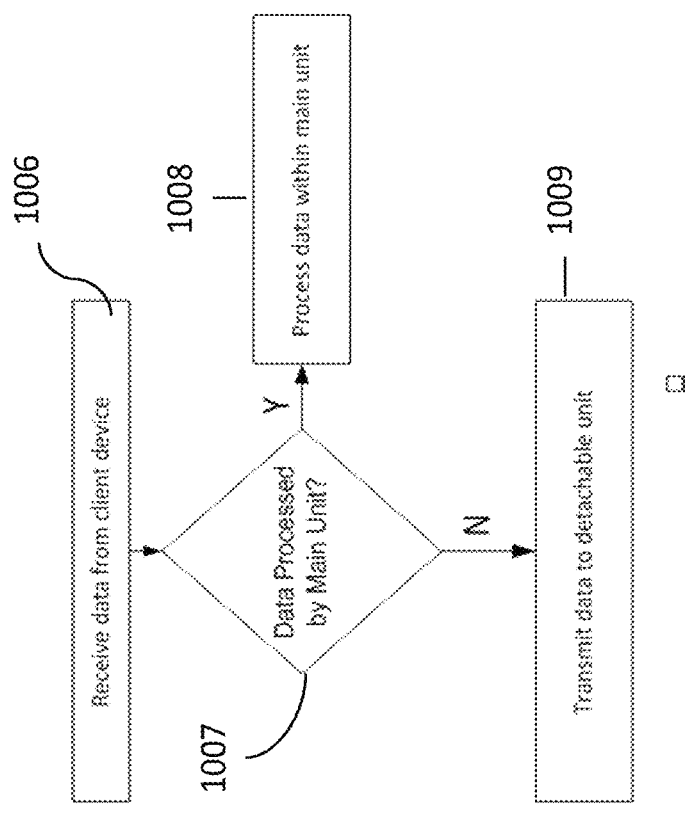
Figure 10B:
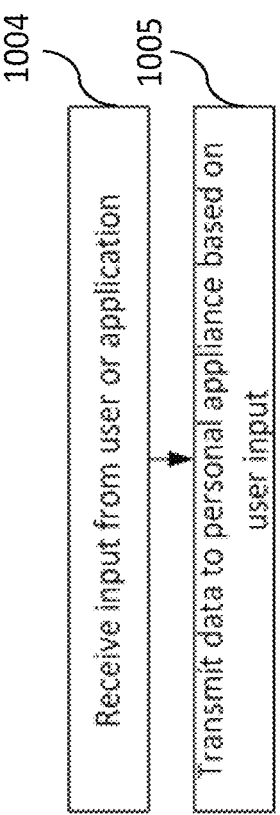

FIG. 10B shows an additional process performed by the circuitry of the client device. At step 1004, the client device may receive an input from a user or an application. For instance, the input from a user may be a command or control input regarding operation of the personal cosmetic appliance 100. Alternatively, the input may be generated by an application on the client device instead of the user. For instance, command and control commands may be generated and input by an application based on data sensed from the sensor in the detachable unit of the personal cosmetic appliance. In step 1005, data (such as command and control data) is transmitted to the personal cosmetic appliance 100 based on the input received from the user or the application.

FIG. 10C shows a process performed by the main unit of the personal cosmetic appliance when data is received from the client device in step 1006. At step 1007, the main unit determines if the data is a type that is meant to be processed by the main unit, and if so it is processed by the main unit at step 1008. For instance, if the data is display data meant to be displayed as an alert on the personal cosmetic appliance, then the main unit will process such data for outputting to, for example, a display device 160 described above. Alternatively, the data may be command or control data, such as a command to control operation of the motor in the main unit, a command to power off the personal cosmetic appliance, or a command to retrieve data stored on the memory of the main unit. Otherwise, the data is transmitted to the detachable unit where the circuitry of the detachable unit will process the data. For instance, if the data is command or control data related to a sensor on the detachable unit, then the data may processed to perform control or calibration of the sensor. Alternatively, the command or control data may be for retrieving data stored a memory of the detachable unit. This scenario is related to the depiction of FIG. 7D discussed above.

Magnetic Connector Embodiment

In the above-described embodiments, the connection between the detachable unit and the main unit of the personal cosmetic appliance is accomplished with a pin 302 interfacing with a pin connector 208. However, either of these parts may deteriorate over time which may result in a failed connection if either of these elements becomes damaged or skewed. Therefore, FIGS. 11A and 11B illustrate an alternative connection mechanism between the detachable unit and the main unit which relies on a magnetic coupling mechanism.

Figure 11A:
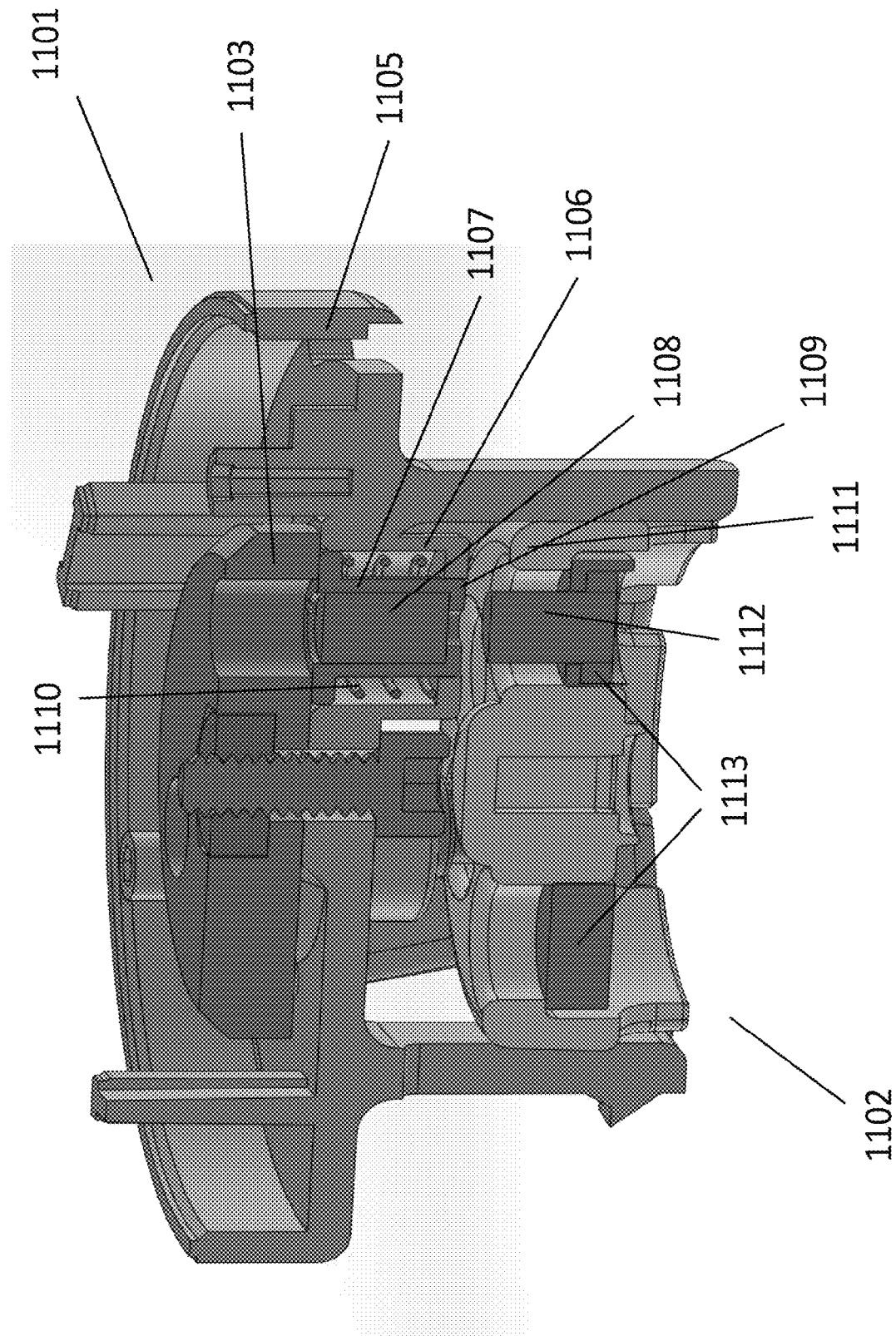
FIGS. 11A and 11B illustrate an alternative connection mechanism between the detachable unit and the main unit which relies on a magnetic coupling mechanism according to an embodiment.

FIG. 11A shows a cross-section of a detachable unit 1101 in a state of connection with a receiving unit 1102 of the main unit, similar to FIG. 4 above. Elements similar to those described in FIG. 204 above will not necessarily be descried in detail with reference to FIG. 11A. The detachable unit 1101 is shown with a counterweight 1103 and interface portion 1105. The interface portion is shown to have a socket 1106 through which a sleeve conductor 1107 is disposed. A top magnet 1108 is provided in the sleeve conductor. The bottom portion of the sleeve conductor is configured to remain flush within an opening 1109 of the socket 1106 when a coil 1110, which is disposed between the sleeve conductor and the inner surface of the socket, is at rest.

The receiving unit 1102 in FIG. 11A includes a top support 1111, through which is disposed a bottom magnet 1112. The bottom magnet is coupled with an electrical conductive element 1113 which is disposed against an inner surface of the top support 1111 and which attaches to wires (not shown) that connect to the processor of the main unit.

Figure 11B:
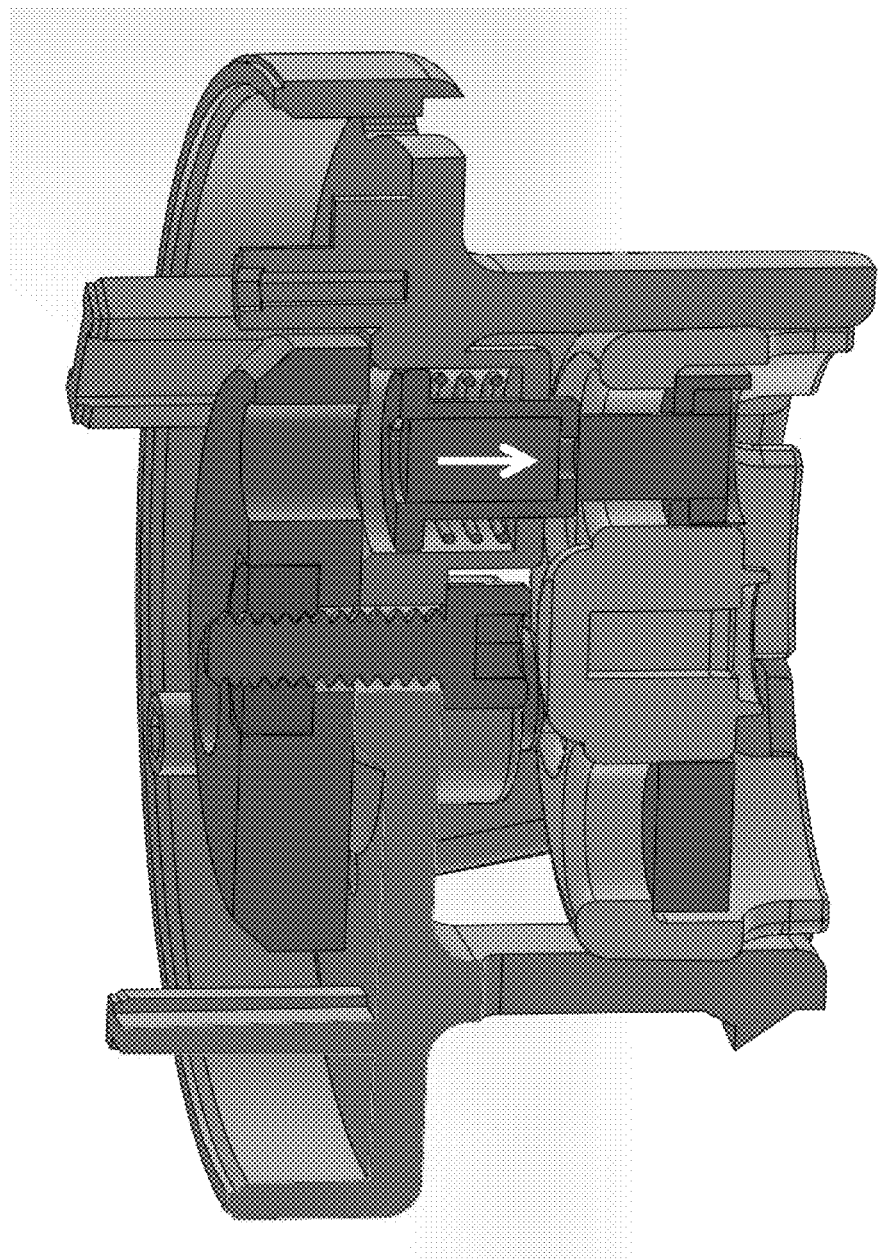

FIG. 11B shows that when the top magnet of the detachable unit and the bottom magnet of the receiving unit are brought within proximity to each other, the magnet and sleeve conductor of the detachable unit move downward (as indicate by the arrow) by magnetic force, further through the opening 1109, to contact the bottom magnet. This contact makes an electrical connection.

Obviously, numerous modifications and variations of the present invention are possible in light of the above teachings. It is therefore to be understood that within the scope of the appended claims, the invention may be practiced otherwise than as specifically described herein.

What is claimed is:
1. A personal cosmetic appliance system comprising:
a personal cosmetic appliance including
 a main unit, which includes a handle portion of the personal cosmetic appliance, physically configured to couple with a detachable unit having a cosmetic applicator configured to perform a cosmetic treatment on a body part of the user and a detachable unit communication interface, the main unit including a main unit communication interface having circuitry configured
 to communicatively couple to the detachable unit communication interface, at a point where the detachable unit is configured to attach to the main unit, to transmit and receive information with the detachable unit, and
 to communicatively couple at least one of the detachable unit communication interface and the main unit communication interface to a client device associated with the personal cosmetic appliance,
 wherein the main unit includes a motor that drives the cosmetic applicator to make repetitive movement relative to the main unit, and the detachable unit communication interface and the main unit communication interface are both disposed on elements that are driven by the motor to make the repetitive movements,
 wherein the main unit communication interface includes circuitry configured to establish a secured protocol and to exchange encrypted and anonymized information with the client device.

2. The personal cosmetic system of claim 1, wherein the main unit communication interface includes circuitry configured to exchange sensor information with the detachable unit.

3. The personal cosmetic system of claim 2, wherein the circuitry of the main unit is configured to transmit the sensor information to the client device for display on the client device.

4. The personal cosmetic system of claim 1, wherein the main unit communication interface includes circuitry configured to exchange control information with a detachable unit associated with a cosmetic applicator.

5. The personal cosmetic system of claim 1, wherein the main unit is configured to receive data from the client device and process the received data.

6. The personal cosmetic system of claim 5, wherein the data received from the client device is command or control data for controlling an operation of the main unit of the personal cosmetic appliance.

7. The personal cosmetic system of claim 1, wherein the main unit is configured to receive data from the client device and transmit the data to the detachable unit via the main unit communication interface for processing the data at the detachable unit.

8. The personal cosmetic system of claim 7, wherein the data received from the client device is data for controlling an operation of the detachable unit of the personal cosmetic appliance.

9. The personal cosmetic system of claim 7, wherein the detachable unit includes at least one sensor, and the data received from the client device is for controlling the sensor.

10. The personal cosmetic system of claim 9, wherein the data received from the client device for controlling the sensor is triggered by sensor data that was previously transmitted from the detachable unit to the client device via the detachable unit communication interface.

11. The personal cosmetic system of claim 7, wherein the detachable unit includes a memory and the data received from the client device is for retrieving data from the memory.

12. The personal cosmetic system of claim 1, wherein the main unit is communicatively coupled to the client device via a wireless connection.

13. A method implemented by a personal cosmetic appliance system that includes a personal cosmetic appliance and a client device, where the personal cosmetic appliance includes a main unit, which includes a handle portion of the personal cosmetic appliance, physically configured to couple with a detachable unit having a cosmetic applicator configured to perform a cosmetic treatment on a body part of the user and a detachable unit communication interface, the method comprising:
communicatively coupling, by circuitry of the main unit at a point where the detachable unit is configured to attach to the main unit, to the detachable unit communication interface to transmit and receive information with the detachable unit, and
communicatively coupling, by the circuitry of the main unit, at least one of the detachable unit communication interface and the main unit communication interface to a client device associated with the personal cosmetic appliance,
wherein the main unit includes a motor that drives the cosmetic applicator to make repetitive movement relative to the main unit, and the detachable unit communication interface and the main unit communication interface are both disposed on elements that are driven by the motor to make the repetitive movements,
wherein the method further includes establishing a secured protocol and to exchange encrypted and anonymized information with a client device.

14. The method of claim 13, further comprising exchanging sensor information with the detachable unit.

15. The method of claim 14, wherein the circuitry of the main unit is configured to transmit the sensor information to the client device for display on the client device.

16. The method of claim 13, wherein further comprising exchange control information with the detachable unit.

17. The method of claim 13, wherein further comprising receiving data from the client device and processing the received data.

18. The method of claim 13, further comprising receiving data from the client device and transmitting the data to the detachable unit via the main unit communication interface for processing the data at the detachable unit.

* * * * *